# 2,715,620

LINEAR SUPERPOLYAMIDES OF 5-T-BUTYL-ISOPHTHALIC ACID

Earl F. Carlston and Funston G. Lum, Richmond, Calif., assignors to California Research Corporation, San Francisco, Calif., a corporation of Delaware No Drawing. Application October 29, 1953, Serial No. 389,176

2 Claims. (Cl. 260—78)

This invention relates to linear superpolyamides possessing improved physical properties.

High polymers of isophthalic acid and hexamethylene diamine are distinguished by their high tensile strength, high melting point, and high heat distortion point. These novel superpolyamides are covered in our co-pending U. S. patent application Serial No. 310,738, filed September 20, 1952.

We have now discovered a novel class of linear superpolyamides of 5-t-butyl-isophthalic acid and an aliphatic diamine of 5 to 10 carbon atoms which are characterized by improved heat resistance compared to similar polymers of ordinary isophthalic acid.

These novel superpolyamides may also be illustrated as possessing recurring units of the structural formula

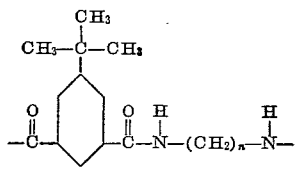

in which $n$ is 5 to 10.

The higher heat resistance of the novel superpolyamides according to this invention makes them particularly suitable for the production of films and fibers which are able to withstand the effect of high temperatures. This very desirable improvement in heat resistance may be attributed to the unique molecular structure of the superpolymers of the invention as illustrated by the above formula.

Although the molecular chains of the present polymers are substituted by a tertiary butyl group, they possess the same high melting point which has been considered an outstanding characteristic of the high polymers of ordinary isophthalic acid and aliphatic diamines. This is entirely unexpected since it has heretofore been found that melting points generally diminish with an increasing degree of substitution on the hydrocarbon chain. (See, for example, the disclosure in lines 46 to 51, inclusive, at page 4 of Carother's U. S. Patent No. 2,130,948.)

The symmetrically positioned tertiary butyl groups which are unique in the present superpolymers are also greatly desired for the improved dyeability, moisture retentivity, and flexural impact strengths they impart to the synthetic plastic compositions.

Pursuant to the invention, 5-t-butyl-isophthalic acid is condensed with an aliphatic diamine of 5 to 10 carbon atoms to produce a high polymer. The condensation may be accomplished by heating the 5-t-butyl-isophthalic acid and diamine in a reaction vessel from which the water formed in the condensation reaction is removed by distillation.

The 5-t-butyl-isophthalic acid may be conveniently and economically prepared by the oxidation of 5-t-butyl meta-xylene.

The aliphatic diamines of 5 to 10 carbon atoms may also be described as polymethylene diamines of 5 to 10 carbon atoms. They may be represented by the following structural formula:

$$H_2N-(CH_2)_n-NH_2$$

in which $n$ is 5 to 10. Hexamethylene diamine, for present purposes, is considered the preferred diamine within the above described group.

The compositions of the invention are illustrated by the following examples. Unless otherwise specified, the proportions given are on a weight basis.

Example 25.0 grams of 5-t-butyl-isophthalic acid were mixed with 27.2 grams of 48 per cent, by weight, aqueous solution of hexamethylene diamine. 21.0 grams of water were added and the mixture was decolorized with activated charcoal. 400 milliliters of ethanol were then added and the mixture cooled to 0° C. to crystallize the salt. The hexamethylene diamine 5-t-butyl-isophthalate salt thus formed was recovered by filtration and partially dried under vacuum.

27.5 grams of the salt obtained above and 0.18 gram of 5-t-butyl-isophthalic acid was mixed with 28.0 grams of xylenol in a glass reaction flask. The mixture was heated to reflux and maintained at that temperature for about four and one-half hours. A vacuum equivalent to 0.01 to 0.1 millimeter of mercury pressure was applied and the xylenol removed. The flask was then heated to 260 to 270° C. and maintained at that temperature for about two and one-half hours to produce the linear superpolyamide of 5-t-butyl-isophthalic acid and hexamethylene diamine.

The highly polymeric hexamethylene 5-t-butyl-isophthalamide prepared above was a hard resinous material at room temperature and had a melting point of about 210° C. It had a heat distortion point of about 145° C. Excellent fibers could be drawn from the material which were capable of withstanding boiling water without softening, curling or contraction.

For the purpose of comparison, superpolymers of hexamethylene diamine and ordinary isophthalic acid were prepared according to the procedure of the above example. The material thus obtained possessed a melting point of about 208° C. It had a heat distortion point of only about 113° C. as determined by ASTM method D648–45T. Fibers formed from the material were found to curl up and contract quickly upon immersion in boiling water.

The superior heat resistant properties of the linear superpolyamides of 5-t-butyl-isophthalic acid and aliphatic diamine of 5 to 10 carbon atoms according to this invention is readily apparent from the above comparison. Although the present high polymers are characterized by approximately the same high melting point as the corresponding polyamides of ordinary isophthalic acid, they possess much higher heat distortion points and softening points and resistance to boiling water. These properties which are totally unanticipated by the prior art are responsible for the improved ability of fibers and films formed from the present polymers to withstand the high temperatures normally encountered in laundering operations such as washing, ironing, and the like.

We claim:

1. A linear superpolyamide of 5-t-butyl-isophthalic acid and an aliphatic diamine of 5 to 10 carbon atoms.

2. A linear high polymer of hexamethylene 5-t-butyl-isophthalamide.

References Cited in the file of this patent

UNITED STATES PATENTS 2,578,654     Hearne et al. _____ Dec. 18, 1951

OTHER REFERENCES

Nightingale et al., J. Amer. Chem. Soc., vol. 64, pp. 1662–1665, 1942.